Jan. 3, 1961 T. M. CROMWELL 2,967,140
METHOD OF PREPARING TETRABORANE
Filed Nov. 22, 1954
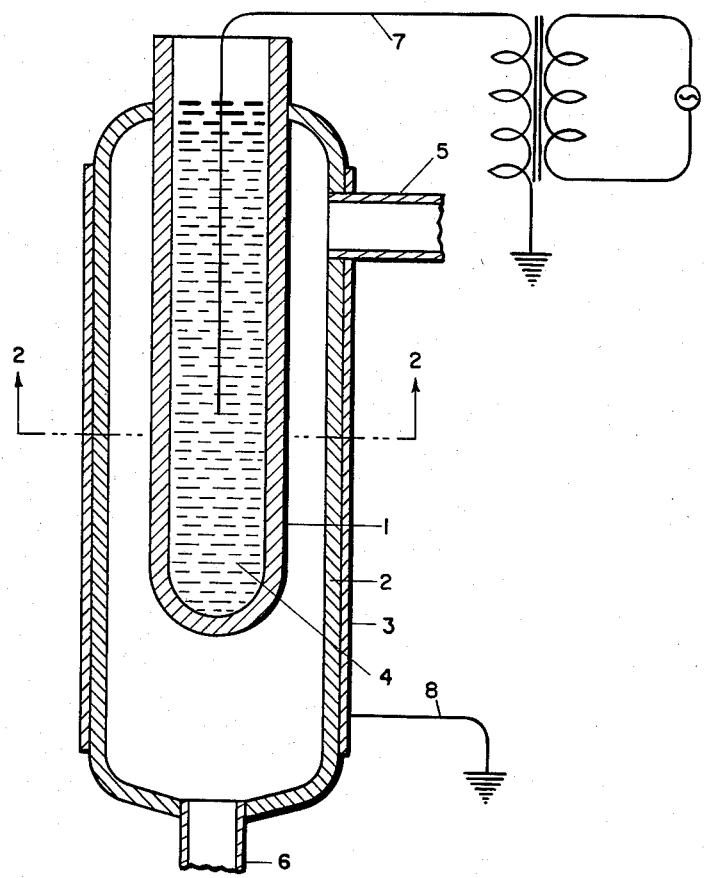
FIG. I
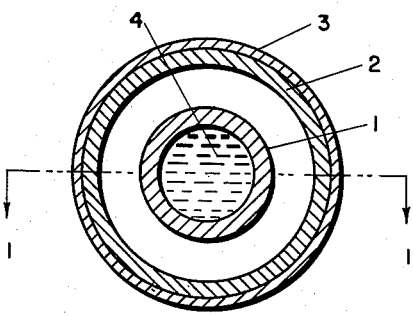
FIG. 2
INVENTOR.
T. M. Cromwell
BY D. Gordon Angus
ATTORNEY

United States Patent Office 2,967,140
Patented Jan. 3, 1961

2,967,140
METHOD OF PREPARING TETRABORANE

Thomas M. Cromwell, Covina, Calif., assignor to Aerojet-General Corporation, Azusa, Calif., a corporation of Ohio Filed Nov. 22, 1954, Ser. No. 470,239

4 Claims. (Cl. 204—164)

This invention relates to a new and improved method for the preparation of tetraborane.

Tetraborane is normally a gas. When dissolved in liquid hydrocarbon fuels such as gasoline, in amounts of the order of about 1% by weight, it has been found to improve dramatically the combustion characteristics of the fuel, causing more complete burning which results in higher engine efficiency and a reduction in noxious exhaust vapors.

It is known that hydrogen gas and dihydropentaborane will react to form tetraborane. Unfortunately, however, this reaction also produces large percentages of other higher boranes. Difficulties in separating the tetraborane further reduce the yield to such a degree that large scale production is highly impractical.

I have found that tetraborane is obtained in high yield by the reduction of diborane in a silent discharge tube, in accordance with the general reaction scheme set forth below:

$$2B_2H_6 \rightarrow B_4H_{10} + H_2$$

The silent discharge tubes used in the practice of this invention are discharge tubes wherein the electrodes are separated from the gas space by insulated layers, and which are energized by an alternating high potential applied across the electrodes. Such discharge tubes are commonly used in the production of ozone.

The configuration and operation of the silent discharge tube will be better understood from the following detailed description and the accompanying drawings, of which:

Figure 1 is a sectional view of the tube taken on the line 1—1 of Figure 2;

Figure 2 is a sectional view of the tube taken on the line 2—2 of Figure 1.

Referring to Figures 1 and 2 in detail, 2 is a glass tube having an inlet 5 and an outlet 6. Tube 2 is coated with brass shim 3. Suspended within tube 2 is an inner glass tube 1 containing the electrolyte 4. The discharge tube is energized by an alternating electrical current of high voltage applied as shown by means of leads 7 and 8.

Figures 1 and 2 illustrate only one of the many commercially available silent discharge tubes which may be employed in practicing this invention. It should be understood that silent discharge tubes having different dimensions and arrangements may be used. A variety of conductive metals such as aluminum (copper, zinc or silver, and inorganic electrolytes such as copper sulfate, potassium chloride or sodium nitrate are suitable as electrode materials. The insulating material is usually glass, but may also be a dielectric such as clay or a non-conductive plastic.

In operating the discharge tube to produce tetraborane, diborane gas is placed in the gas space and an alternating high potential is applied across the electrodes. I have found that optimum results are obtained when the potential drop: gas pressure ratio in the discharge tube is from about 10 volt/1 mm. gap/1 mm. gas pressure, to about 90 volt drop/1 mm. gap/1 mm. gas pressure. The reaction is preferably conducted at a gas pressure above about 100 mm. mercury. The residence time producing optimum yields of tetraborane depends upon the pressure of the gas, the magnitude of the potential and the width of the gap. Usually residence times of from about ½ to about 3 minutes are employed when the gas pressure is from about 100 to about 1100 mm. mercury, the gap width about 2 mm. and potentials from about 15,000 to about 20,000 volts.

To more clearly illustrate the invention, the following examples are presented. It should be understood, however, that these examples are presented merely as a means of illustration, and are not intended to limit the scope of the invention in any way.

EXAMPLE I

*Preparation of tetraborane at 15 volt drop/1 mm. gap/1 mm. gas pressure ratio*

The silent discharge tube used was similar to that used in a low-temperature ozonizer. It consisted of 2 concentric glass tubes; the inner tube had an outside diameter of 12 mm., and the outer tube had an inside diameter of 16 mm. The annular space was thus 2 mm. The inner tube was filled with an aqueous solution of copper sulfate and served as 1 electrode while the other electrode consisted of brass shim material, 0.005 inch thick wrapped around the outer tube. The electrodes were 75 mm. long. A potential of 15,000 volts was applied between the electrodes. This was supplied by a high voltage transformer with the primary coil of the transformer connected to a variable transformer operating from a 110 v. 60 cycle source. The pressure of diborane in the discharge was 500 mm. mercury and the flow rate was adjusted so that the residence time in the discharge tube was 30 seconds. The diborane conversion percentage was 8.5%. A 90% yield of tetraborane and 10% yield of non-volatile boron hydrides was obtained.

EXAMPLE II

*Preparation of tetraborane at 86.5 volt/1 mm. gap/1 mm. gas pressure ratio*

Using the discharge tube described in Example I, a potential of 17,300 volts was applied between the electrodes. The pressure of diborane in the discharge tube was 100 mm. mercury and the flow rate was adjusted so that residence time in the dicharge tube was 103 seconds. The diborane conversion was 66⅔%. A 5% yield of tetraborane and a 95% yield of non-volatile boron hydrides was obtained.

EXAMPLE III

To better illustrate the invention, a series of operating conditions using the discharge tube described in Examples I and II, and the results obtained, are shown in Table I.

TABLE I

| Voltage | Pressure, mm. | Residence Time | Conversion, percent | Yield, $B_4H_{10}$, percent |
|---|---|---|---|---|
| 16,000 | 636 ($B_2H_6$) | 1 minute | 7 | 97 |
| 15,000 | 554 ($B_2H_6$) | 1 minute | 13 | 74 |
| 15,000 | 150 ($B_2H_6$) | 1 minute | 54 | 30 |
| 20,000 | 150 ($B_2H_6$) | 50 seconds | 36 | 43 |

The percentage yields are based upon the amount of diborane undergoing reaction.

From the data presented above, it can be seen that by reducing diborane in a silent discharge tube, tetraborane of high purity is produced in high yield. Due to the importance of tetraborane as a fuel additive, it is believed my process will find valuable use in industry.

I claim:

1. The method of preparing tetraborane which comprises subjecting diborane, at a gas pressure greater than about 100 mm. of mercury, to the discharge produced by a silent discharge tube having electrodes separated from the gas space by insulating layers and energized by an alternating potential of from about 10 volts/mm. gap/mm. of mercury gas pressure to about 90 volts/mm. gap/mm. of mercury gas pressure.

2. The method of preparing tetraborane which comprises subjecting diborane, at a gas pressure of from about 100 mm. to about 1000 mm. of mercury, to the discharge produced by a silent discharge tube having electrodes separated from the gas space by insulating layers and energized by an alternating potential of from about 5,000 volts to about 10,000 volts/mm. gap width.

3. The method of preparing tetraborane which comprises subjecting diborane, at a gas pressure of from about 100 mm. to about 1,100 mm. of mercury, to the discharge produced by a silent discharge tube having electrodes separated from the gas space by insulating layers, a gap of about 2 mm., and energized by an alternating potential of from about 15,000 volts to about 20,000 volts.

4. The method of preparing tetraborane which comprises subjecting diborane, at a gas pressure of from about 100 mm. to about 1,100 mm. of mercury, to the discharge produced by a silent discharge tube having electrodes separated from the gas space by insulating layers, a gap of about 2 mm., and energized by an alternating potential of from about 15,000 volts to about 20,000 volts, for a period of from about one-half to about three minutes.

References Cited in the file of this patent

Journal of American Chemical Society, vol. 53, December 1931, pages 4321–4332.

Berichte der Deutsche Chemische Gesellschaft 69B, 1469–75 (1936).

"The Electrochemistry of Gases and Other Dielectrics," G. Glocker and S. C. Lind, John Wiley & Sons, N.Y. (1939), pages 56–63.

Boron Hydrides and Related Compounds, by W. H. Schechter et al., Dept. of the Navy, Bureau of Aeronautics, declassified Jan. 5, 1954, page 27.